United States Patent
Jeong (10) Patent No.: US 9,037,489 B2
(45) Date of Patent: May 19, 2015

(54) METHOD AND SYSTEM FOR COLLECTING ACCESS POINT INFORMATION IN LINKAGE WITH MOBILE CARD PAYMENT SYSTEM, AND MOBILE COMMUNICATION TERMINAL THEREFOR

(75) Inventor: Seung-Hyuk Jeong, Seoul (KR)

(73) Assignee: KT Corporation, Seongnam (KR)

( * ) Notice: Subject to any disclaimer, the term of this patent is extended or adjusted under 35 U.S.C. 154(b) by 98 days.

(21) Appl. No.: 13/335,392

(22) Filed: Dec. 22, 2011

(65) Prior Publication Data

US 2012/0209732 A1    Aug. 16, 2012

(30) Foreign Application Priority Data

Feb. 10, 2011    (KR) .......................... 10-2011-0011992

(51) Int. Cl.
  H04W 4/00        (2009.01)
  H04W 24/00       (2009.01)
  G06Q 20/00       (2012.01)
  G06Q 20/32       (2012.01)
  G06Q 20/42       (2012.01)

(52) U.S. Cl.
  CPC ............ *G06Q 20/3224* (2013.01); *G06Q 20/42* (2013.01)

(58) Field of Classification Search
  None
  See application file for complete search history.

(56) References Cited

U.S. PATENT DOCUMENTS

| | | | |
|---|---|---|---|
| 7,376,431 B2 * | 5/2008 | Niedermeyer | 455/456.3 |
| 2002/0094821 A1 * | 7/2002 | Kennedy, Jr. | 455/456 |
| 2007/0077945 A1 * | 4/2007 | Sheynblat | 455/456.5 |
| 2008/0004037 A1 * | 1/2008 | Achlioptas et al. | 455/456.1 |
| 2010/0121764 A1 * | 5/2010 | Niedermeyer | 705/44 |
| 2010/0324813 A1 * | 12/2010 | Sundararajan et al. | 701/208 |
| 2011/0018732 A1 | 1/2011 | Cho et al. | |
| 2011/0026506 A1 * | 2/2011 | Macnaughtan et al. | 370/338 |
| 2011/0078043 A1 * | 3/2011 | Ra | 705/26.41 |
| 2011/0106942 A1 * | 5/2011 | Roskowski et al. | 709/224 |

FOREIGN PATENT DOCUMENTS

| | | |
|---|---|---|
| KR | 1020070060367 A | 6/2007 |
| KR | 1020110007872 A | 1/2011 |
| KR | 1020110011546 A | 2/2011 |

* cited by examiner

*Primary Examiner* — Allen Chein
(74) *Attorney, Agent, or Firm* — Sughrue Mion, PLLC

(57) ABSTRACT

Provided is a method and system for collecting access point information in linkage with a mobile card payment system to measure a location of a user using an access point of a wireless local area network (WLAN) service. The method may include (a) receiving payment information relating to a mobile communication terminal from a card company server, (b) transmitting an access point information collecting control signal to the mobile communication terminal based on the payment information, (c) receiving access point information collected by the mobile communication terminal in response to the control signal, and (d) storing the received access point information in a storage means.

19 Claims, 8 Drawing Sheets

| GROUP | TIME | LOCATION (LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.122 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

METHOD AND SYSTEM FOR COLLECTING ACCESS POINT INFORMATION IN LINKAGE WITH MOBILE CARD PAYMENT SYSTEM, AND MOBILE COMMUNICATION TERMINAL THEREFOR

CROSS-REFERENCE TO RELATED APPLICATION(S)

This application claims priority from Korean Patent Application No. 10-2011-0011992, filed on Feb. 10, 2011 in the Korean Intellectual Property Office, the disclosure of which is incorporated herein by reference in its entirety.

BACKGROUND

1. Field

Exemplary embodiments relate to a technique for determining a location of a user using an access point of a wireless local area network (WLAN) service, and more particularly, to a method and system for collecting access point information in linkage with a mobile card payment system.

2. Description of the Related Art

With the development of mobile communication techniques, studies have been actively conducted on location measuring techniques that measure a location of a mobile terminal in a communication network. Typically, a global positioning system (GPS)-based location measuring technique using satellites and a network-based location measuring technique using base stations have been widely employed.

The GPS-based location measuring technique has a disadvantage of requiring that a GPS receiver be mounted on a mobile terminal. Also, because the GPS-based location measuring technique was developed by the U.S. Department of Defense for military use, a high-precision GPS-based location measuring technique is not publicly disclosed.

Although the network-based location measuring technique is advantageous in that it does not require that a GPS receiver be mounted on a mobile terminal, in comparison to the GPS-based location measuring technique, it is less accurate for a purpose of location measurement, because a location measurement error of up to several tens or several hundreds of meters may occur.

Meanwhile, the use of WLAN service is becoming more popular. The WLAN service enables users of mobile terminals to wirelessly connect to the Internet through a WLAN access point near the mobile terminals, such as, for example, laptop computers, personal digital assistants (PDAs), smart phones, and the like, that have WLAN cards mounted therein. Recently, to meet the increasing demand for the WLAN service, installations of access points in buildings, such as large-scale shopping malls, and the like, have increased.

Because many access points have now been installed in buildings, a location of a mobile terminal can be measured by using the access points in buildings where a GPS-based location measuring technique could not otherwise be applied, and the measured location can provide higher accuracy than the conventional network-based location measuring technique using base stations.

Accordingly, research and development relating to a location measuring technique using an access point of a WLAN service has recently been flourishing. When performing location measurement using an access point, the most important consideration is construction of a database where access point information is organized and stored. In particular, it is generally true that the larger the number of items of access point information stored in the database and the higher the accuracy of the access point information, the higher the accuracy of location measurement.

To collect access point information, conventionally a scanning car is used to collect access point information while traveling on the road. Thus, only information relating to access points located along a path accessible by the scanning car is collected, and information relating to access points located in areas which are difficult to scan, such as, for example, the inside of a building, is not collected.

Because most access points are located inside buildings, this method of using a scanning car presents difficulties with respect to the purpose of thoroughly collecting information relating to access points, and in this context, when the collected access point information is used for measuring a location of a terminal or constructing a database, the accuracy of such a location measurement performed by using an access point may be reduced, thereby resulting in a deterioration in service quality.

SUMMARY

Aspects of the exemplary embodiments are directed to providing a method and system for collecting information relating to access points in linkage with a mobile card payment system, especially with respect to access points installed in an inaccessible area such as the inside of a building, thereby improving the accuracy of location measurements performed by using an access point of a wireless local area network (WLAN) service.

Additional aspects will be set forth in the following description, and in part will be apparent from the exemplary embodiments set forth, or may be learned by practice.

In one aspect of the exemplary embodiments, provided is an access point information collecting method for collecting information relating to access points in linkage with a mobile card payment system to organize installation information relating to the access points, the method including (a) receiving payment information relating to a mobile communication terminal from a card company server, (b) transmitting an access point information collecting control signal to the mobile communication terminal based on the payment information, (c) receiving access point information collected by the mobile communication terminal in response to the control signal, and (d) storing the received access point information in a storage means.

In another aspect of the exemplary embodiments, provided is an access point information collecting apparatus for collecting information relating to access points in linkage with a mobile card payment system to organize installation information relating to the access points, the apparatus including a payment checking means to receive payment information relating to a mobile communication terminal from a card company server, a control signal transmitting means to transmit an access point information collecting control signal to the mobile communication terminal based on the payment information received by the payment checking means, an information receiving means to receive access point information collected by the mobile communication terminal in response to the control signal, and a storage means to store the access point information received by the information receiving means.

In still another aspect of the exemplary embodiments, provided is a mobile communication terminal for collecting information of access points in linkage with a mobile card payment system to organize installation information of the access points, the mobile communication terminal including a mobile card paying module having a mobile card paying function to make a payment through a point-of-sale (POS) terminal, and an access point information providing module to receive an access point information collecting control signal from an access point information collecting system when the mobile communication terminal makes a mobile card payment, to collect information of nearby access points in response to the control signal, and to transmit the collected access point information to the access point information collecting system.

In yet another aspect of the exemplary embodiments, provided is an access point information collecting system for collecting information relating to access' points in linkage with a mobile card payment system to organize installation information relating to the access points, the system including a card company server to provide payment information relating to a mobile communication terminal through a point-of-service (POS) terminal, an access point information collecting server to transmit an access point information collecting control signal to the mobile communication terminal based on the payment information relating to the mobile communication terminal received from the card company server and to store access point information collected by the mobile communication terminal, and a mobile communication terminal having a mobile card paying function to execute a payment through the POS terminal when receiving an access point information collecting control signal from the access point information collecting server, to collect access point information based on the control signal, and to transmit the collected access point information to the access point information collecting server.

Throughout the drawings and the detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be apparent to those of ordinary skill in the art. Also, descriptions of well-known functions and constructions may be omitted for increased clarity and conciseness.

Figure 1:
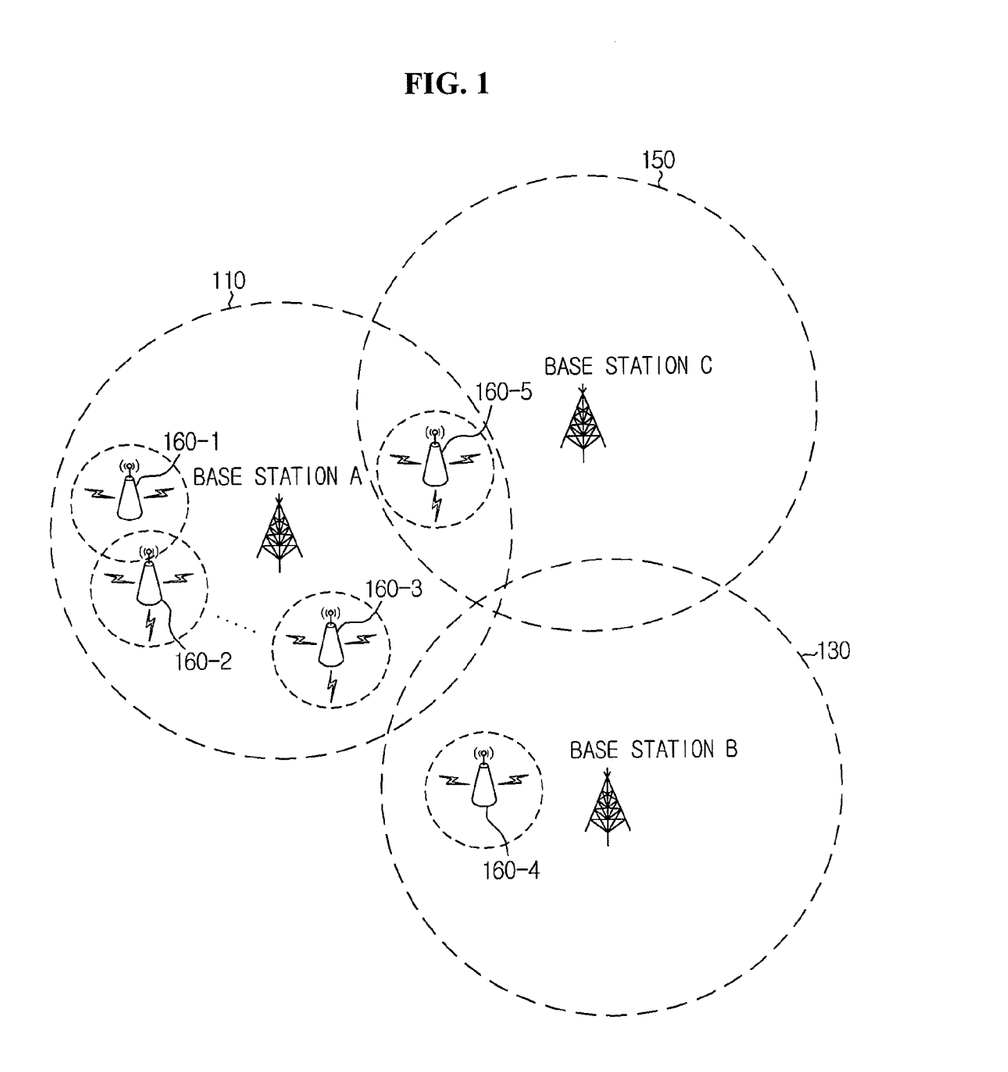
FIG. 1 is a diagram illustrating a communication environment according to an exemplary embodiment.

FIG. 1 is a diagram illustrating a communication environment according to an exemplary embodiment.

Referring to FIG. 1, the communication environment includes base stations (illustrated as "Base Station A," "Base Station B," and "Base Station C") that provide a mobile communication service, and access points (APs) 160-1, 160-2, 160-3, 160-4, 160-5 that provide an Internet service using a wireless local area network (WLAN) system, for example, Wireless Fidelity (WiFi), in an arrangement which includes overlapping coverage area 110, 130, and 150. A communication terminal may use various services, including, for example, voice communication and wireless Internet services, via a base station when the communication terminal is mobile. Also, the communication terminal may use an Internet service by connecting to a wired Internet network via an access point.

Generally, each base station may have a roughly circular coverage area corresponding to a radius of several kilometers to tens of kilometers, while a typical access point providing an Internet service using a WLAN system may have a roughly circular coverage area corresponding to a radius of only several meters. Due to the low costs for purchasing and installing the access points, they are often installed in large numbers at various places and in many types of buildings such as, for example, houses, offices, shopping malls, and the like.

As shown in FIG. 1, a plurality of access points 160-1, . . . , 160-5 are positioned within the coverage areas 110, 130, and 150 of base stations. Communication terminal users may use an Internet service via at least one of the access points 160-1, . . . , 160-5 at locations where a signal of the respective at least one access point 160-1, . . . , 160-5 is detected. Also, where a signal of the access point 160-1, . . . , 160-5 is not detected, the communication terminal users may use an Internet service via the base station.

Recently, with the advancement of smart phone functions (i.e., operations), the number of smart phone users is increasing. To provide a high-speed Internet service for use via smart phones, the number of access points being installed is also increasing. As many access points are particularly installed in places with a large floating population, the use of the access points for a purpose of location measurement is increasing. The accuracy of a location measurement using an access point with a narrow coverage is generally higher than that of a base station with a wide coverage.

Figure 2:
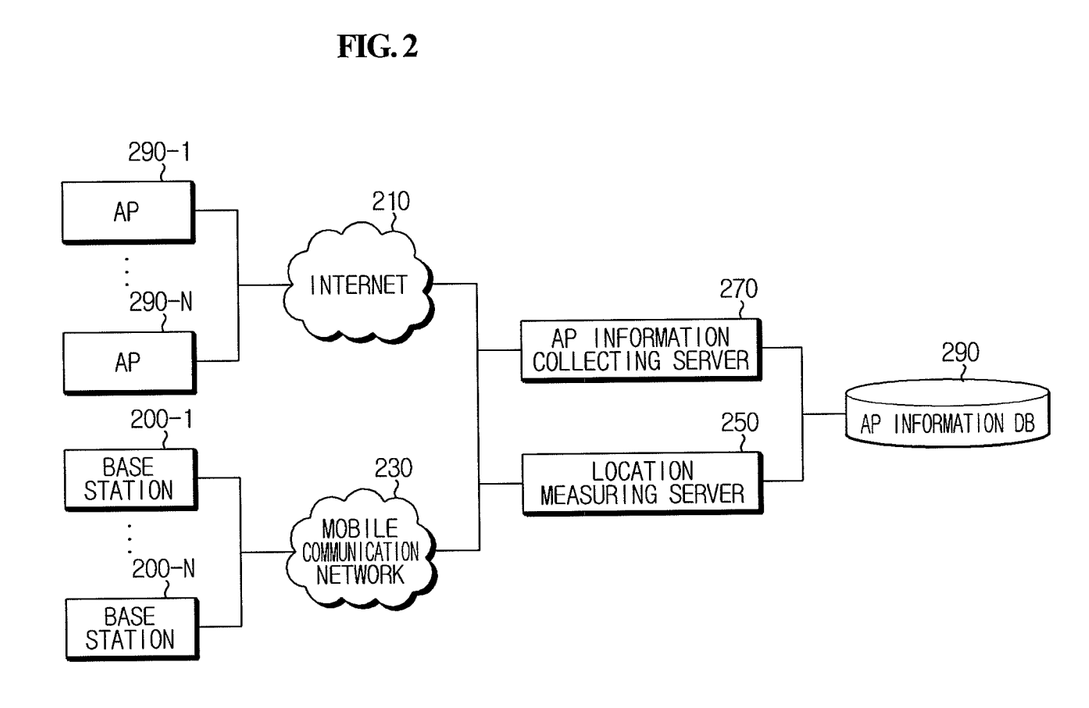
FIG. 2 is a block diagram illustrating a network structure of a location measuring system according to an exemplary embodiment.

FIG. 2 is a block diagram illustrating a network structure of a location measuring system according to an exemplary embodiment.

Referring to FIG. 2, access points 290-1, . . . , 290-N for providing access to an Internet service using a WLAN system and base stations 200-1, . . . , 200-N for providing access to a mobile communication service are provided in the network structure. As shown in FIG. 1, the respective coverage areas of the access points 290-1, . . . , 290-N and the respective coverage areas of the base stations 200-1, . . . , 200-N may overlap. A plurality of access points may be installed within the coverage area of one base station because the base station has a wider coverage area than any one of the plurality of access points.

The access points 290-1, . . . , 290-N are connected to a wired Internet network 210 to provide an Internet service. The base stations 200-1, . . . , 200-N are connected to a mobile communication network 230 to provide a mobile communication service. The wired Internet network 210 and the mobile communication network 230 are linked to each other. Referring to FIG. 2, the location measuring system includes an access point (AP) information collecting server 270 and a location measuring server 250 connected to the wired Internet network 210 and the mobile communication network 230, and an AP information database (DB) 290 for storing access point information collected by the AP information collecting server 270.

The AP information DB 290 stores identity information (such as, for example, Media Access Control (MAC) address, Service Set Identifier (SSID), and the like) of access points installed (i.e., located) indoors and outdoors and location coordinate information relating to where the access points are actually installed. Also, the AP information DB 290 stores access point information relating to location that is collected at each location by an access point information collecting terminal while the access point information collecting terminal is mobile. The access point information relating to location includes collection location information collected by the access point information collecting terminal in accordance with a predetermined time cycle while the access point information collecting terminal is mobile, identity information and signal strength of access points detected at the collection locations, and identity information relating to base stations. A detailed description thereof will be provided below. Also, the AP information DB 290 stores imaginary location coordinates of the access points determined by the location measuring server 250.

When the location measuring server 250 is requested to measure a location of a specific communication terminal, the location measuring server 250 measures a location of the communication terminal using identity information of an access point 290-1, . . . , 290-N accessible by the communication terminal.

Figure 3:
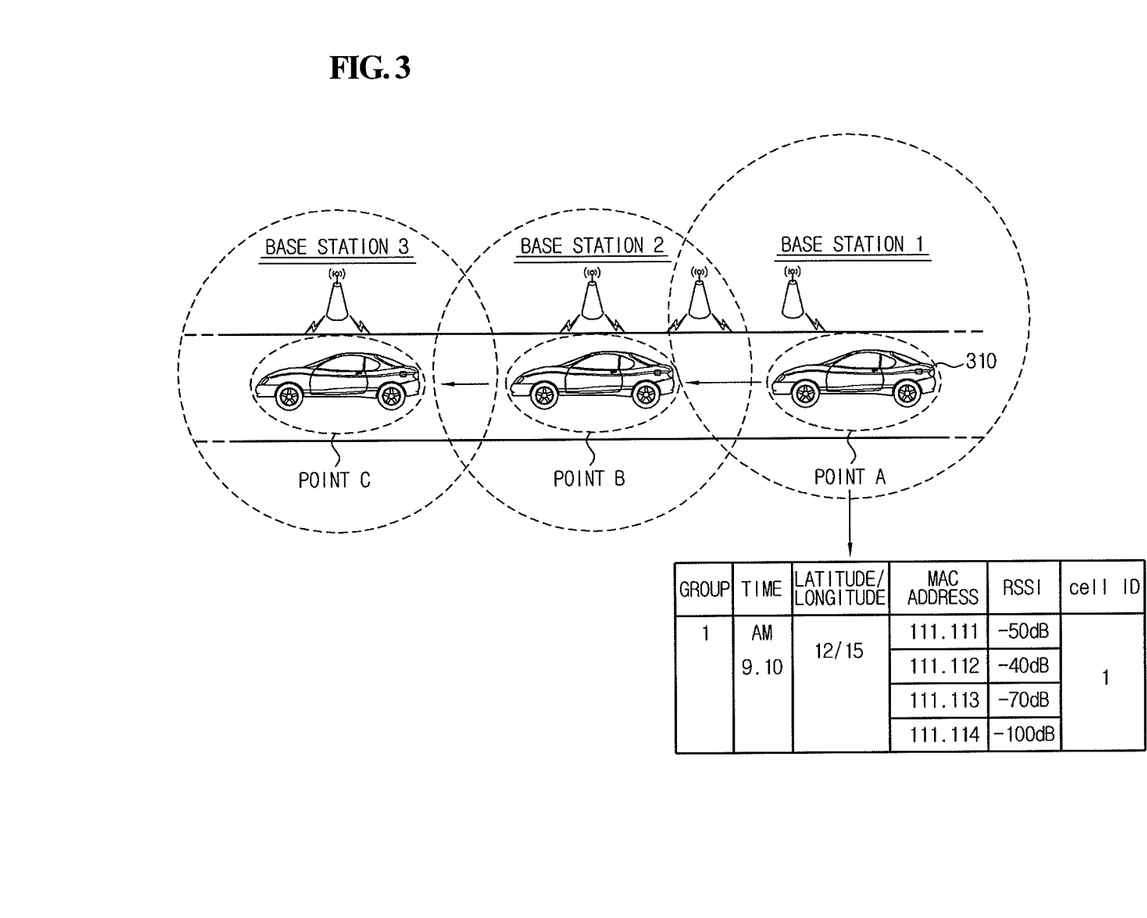
FIG. 3 is a diagram illustrating the collection of access point information for use in location determination according to an exemplary embodiment.

FIG. 3 is a diagram illustrating the collection of access point information relating to location according to an exemplary embodiment.

As shown in FIG. 3, a scanning vehicle 310 collects information by measuring signals emitted from nearby access points in accordance with a predetermined time cycle while the vehicle 310 is moving at low speed. The information collected by the vehicle 310 includes one or more of the following quantities: collection time, collection location information (such as, for example, latitude and longitude), identity information (such as, for example, MAC address) and signal strength (for example, Received Signal Strength Indication (RSSI)) of an access point which emits a signal detected at a collection location, and identity information (such as, for example, cell ID or Pseudo Noise (PN) code) of a base station which covers the corresponding collection location.

Referring to FIG. 3, using point A as an example, the vehicle 310 collects information relating to an access point which emits a signal detected at the point A. For example, the vehicle 310 collects latitude and longitude information of the point A, collection time, MAC address and signal strength (RSSI) of the access point which emits the signal detected at the point A, and identity information of a base station which covers the point A. As described above, the vehicle 310 collects information relating to access points detected at every point in accordance with a predetermined time cycle (such as, for example, every minute) while moving at a low speed.

Figure 4:
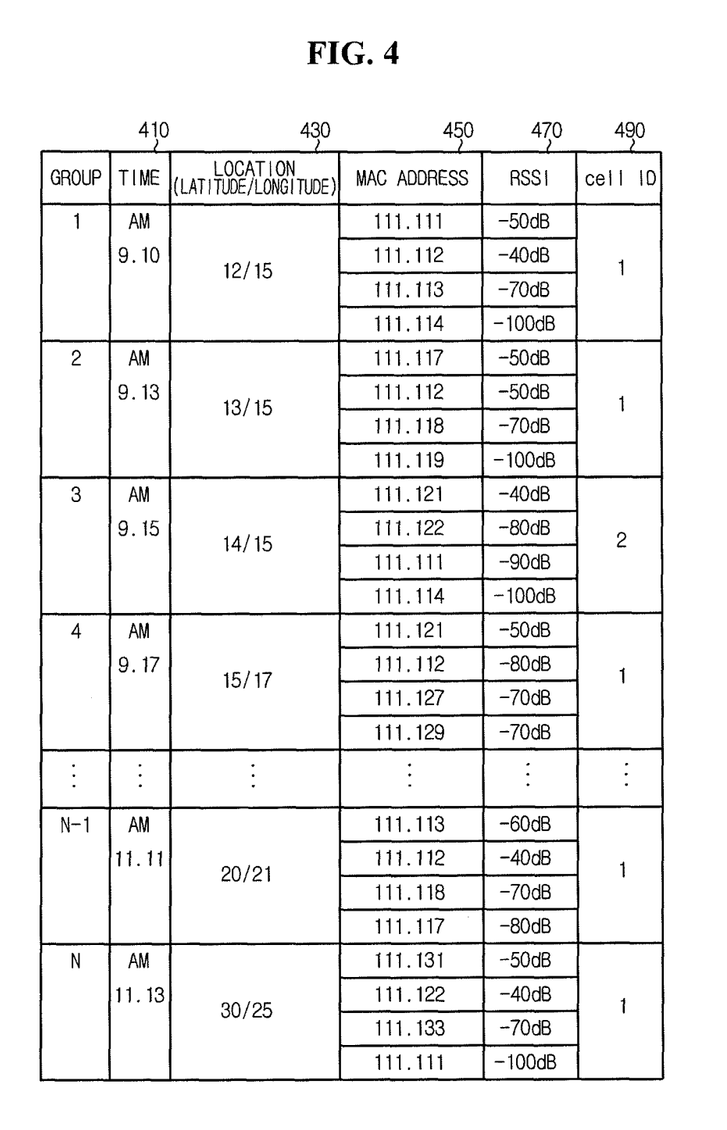
FIG. 4 is a table of access point information for use in location determination according to an exemplary embodiment.

FIG. 4 is a table of access point information relating to location according to an exemplary embodiment. As described above with reference to FIG. 3, the vehicle 310 collects information relating to nearby access points in accordance with a predetermined time cycle while moving, and the collected access point information for location is shown in FIG. 4. As shown in FIG. 4, the table has a time field 410, a location field 430, a MAC address field 450, an RSSI field 470, and a cell ID field 490.

The time field 410 records the time when the vehicle 310 collects information relating to an access point. The location field 430 records collection location information (e.g., latitude and longitude information). The MAC address field 450 records a MAC address of an access point detected at a collection location. The RSSI field 470 records the signal strength of a signal emitted from an access point and detected at a collection location. The cell ID field 490 records a cell identification (ID) of a base station covering a collection location. Although FIG. 4 shows only one cell ID for a base station being recorded, a plurality of cell IDs detected at the cell boundary may be recorded.

To measure a location of a communication terminal using an access point, the location measuring method according to the present exemplary embodiment utilizes installation location coordinates (i.e., actual location coordinates) of access points. Generally, the access points installed in most or all locations by communication service providers have their installation location coordinates given by the communication service providers. However, a personal access point, which may be installed by an individual person or persons, is not related to the communication service providers. Accordingly, installation location coordinates of such a personal access point may not be known unless the installation location coordinates are identified by an installer. In this context, there may be a need to estimate installation location coordinates of an access point for which the installation location coordinates are not identified. Of the various methods being used, one exemplary method includes calculating a point of inflection in signal strength values over time using the signal strength values of a signal emitted from an access point and location coordinate values of a scanning vehicle when measuring the signal strength of the signal emitted from the access point, and using the calculated point of inflection to estimate the installation location coordinates of the access point.

According to the conventional method, the accuracy of an estimated installation location coordinate of an access point depends on how widely and thoroughly a scanning vehicle travels to collect access point information. However, collection of access point information using the vehicle may be insufficient and inaccurate due to area limitations, such as, for example, the access point being located in the inside of a building or in an area inaccessible by the vehicle. Accordingly, the exemplary embodiments provide a method for collecting access point information using a mobile communication terminal that makes a mobile card payment through a point-of-sale (POS) terminal in linkage with a mobile card payment system, so as to obtain information relating to an access point installed in an area difficult to scan.

Hereinafter, a method for collecting access point information in linkage with a mobile card payment system in accordance with an exemplary embodiment is described with reference to FIG. 5.

Figure 5:
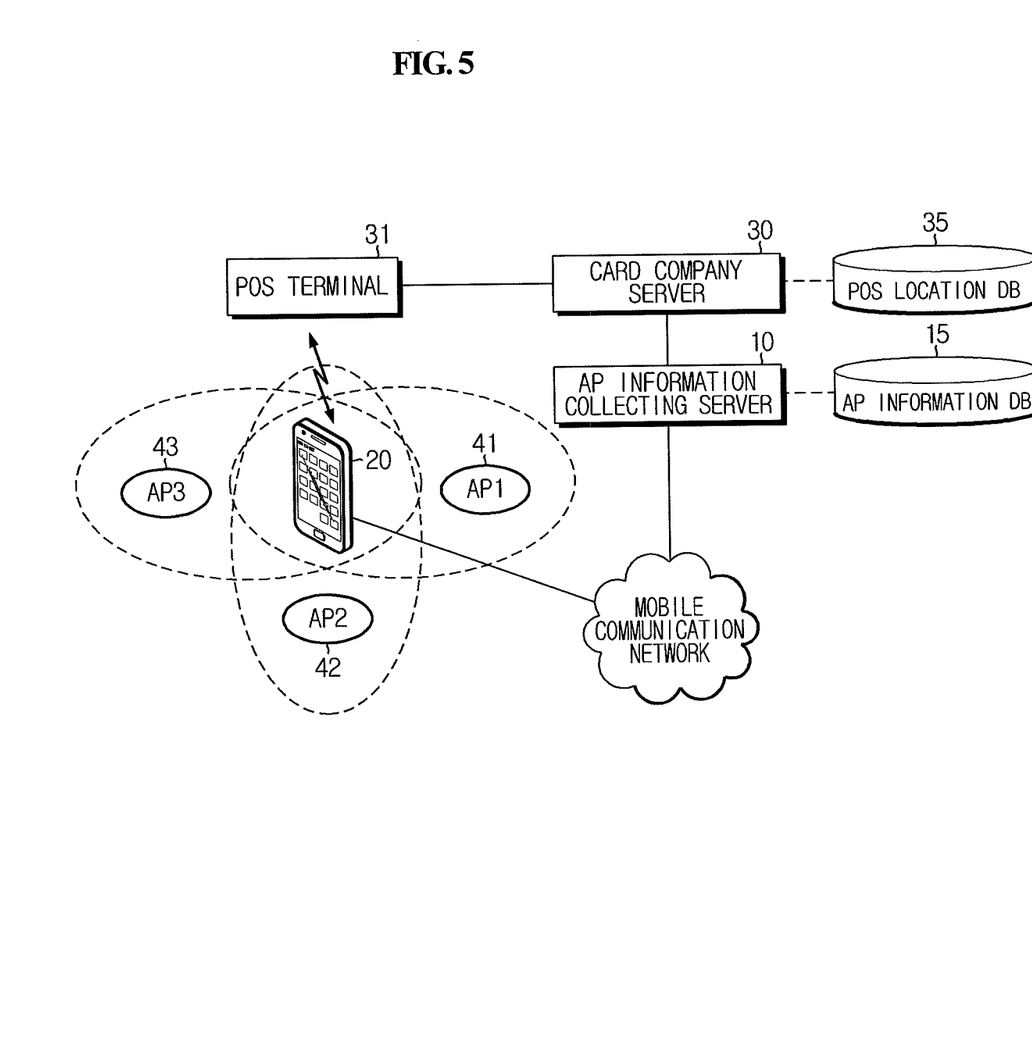
FIG. 5 is a block diagram illustrating a structure of an access point information collecting system linking with a mobile card payment system according to an exemplary embodiment.

FIG. 5 is a block diagram illustrating a structure of an access point information collecting system which is linked with a mobile card payment system according to an exemplary embodiment.

Referring to FIG. 5, an access point information collecting system according to an exemplary embodiment includes an AP information collecting server 10, a mobile communication terminal 20, and a card company server 30 managing a POS terminal 31.

The AP information collecting server 10 collects access point information that will be stored in an AP information database (DB) 15. In this instance, the AP information collecting server 10 collects access point information through a scanning vehicle as described above, and further collects access point information through the mobile communication terminal 20 which is executing a mobile card payment.

For this purpose, the AP information collecting server 10 links to the card company server 30 managing the POS terminal 31, and when the mobile communication terminal 20 executes a mobile card payment, the AP information collecting server 10 receives payment information from the card company server 30. Also, the AP information collecting server 10 controls the mobile communication terminal 20 to collect and transmit access point information based on the received payment information. In this instance, the AP information collecting server 10 transmits an AP information collecting control signal to the mobile communication terminal 20 via a mobile communication network, and receives access point information collected by the mobile communication terminal 20 in response to the control signal.

The access point information collected by the mobile communication terminal 20 in response to the control signal may include signal strength information and collection time information. Also, location information relating to where the access point information is collected may be included. The access point information collecting server 10 receives installation location information of the POS terminal 31 through which the mobile communication terminal 20 executes a mobile card payment from the card company server 30, and estimates the installation location of the POS terminal 31 as being a location where access point information is collected by the mobile communication terminal 20.

As described above, an installation location of the POS terminal 31 through which the mobile communication terminal 20 executes a mobile card payment is estimated as being a location where the access point information is collected by the mobile communication terminal 20, and the access point information collected by the mobile communication terminal 20 is stored or updated in the AP information DB 15, so that installation location information relating to access points can be organized.

The card company server 30 generally operates and manages a plurality of POS terminals 31 installed in many areas, and approves the mobile card payment executed by the mobile communication terminal 20. As illustrated in FIG. 5, in an exemplary embodiment, card company server 30 includes a POS location DB 35 to store and manage installation location information relating to the POS terminals 31. When the mobile communication terminal 20 executes a mobile card payment through the POS terminal 31, the card company server 30 provides payment information to the AP information collecting server 10. In this instance, the payment information provided to the AP information collecting server 10 includes identity information relating to the mobile communication terminal 20 and installation location information relating to the POS terminal 31 through which the mobile communication terminal 20 makes a mobile card payment.

The installation location information of the POS terminal 31 may be extracted from the POS location DB 35 of the card company server 30, or the payment information (including installation location information of the POS terminal 31) provided to the card company server 30 when the mobile communication terminal 20 executes a mobile card payment through the POS terminal 31.

When the mobile communication terminal 20 executes a mobile card payment through the POS terminal 31, identity information relating to the mobile communication terminal 20 is also provided from the mobile communication terminal 20 to the card company server 30 through the POS terminal 31. The identity information relating to the mobile communication terminal 20 may be used as called party address information when the AP information collecting server 10 transmits an AP information collecting control signal to the mobile communication terminal 20. The identity information relating to the mobile communication terminal 20 may include, for example, at least one of a telephone number, an international mobile subscriber identity (IMSI), a mobile station international subscriber directory number (MSISDN), a mobile identification number (MIN) and an international mobile equipment identity (IMEI) of the mobile communication terminal 20.

The POS terminal 31, through which the mobile communication terminal 20 executes a mobile card payment, is installed in an affiliated shop requiring mobile card payment, and is connected to the card company server 30. When the mobile communication terminal 20 executes a mobile card payment through the POS terminal 31, the POS terminal 31 refers to the mobile card for payment approval through communication with the card company server 30, and when the mobile card payment is approved, the POS terminal 31 provides payment information to the card company server 30. In this instance, the payment information may include identity information relating to the mobile communication terminal 20 and location information relating to where the mobile communication terminal 20 executes a mobile card payment.

The mobile communication terminal 20 has a mobile card paying function to execute a mobile card payment through the POS terminal 31 installed in many areas, including, for example, the inside of a building. The mobile communication terminal 20 receives an AP information collecting control signal from the AP information collecting server 10, collects access point information in response to the control signal, and transmits the access point information to the AP information collecting server 10. Specifically, the mobile communication terminal 20 executes an access information collecting function in response to the control signal to detect nearby access points AP1 41, AP2 42, and AP3 43, collects information relating to each of the access points AP1 41, AP2 42, and AP3 43 by measuring the signal strength of a signal emitted by each access point AP1 41, AP2 42, and AP3 43, and transmits the access point information to the AP information collecting server 10. The AP information collecting control signal received from the AP information collecting server 10 may take the form of a short messaging service (SMS) triggering message. Accordingly, when the mobile communication terminal 20 receives the SMS triggering message, the mobile communication terminal 20 executes an access point information collecting function in response to the triggering message to collect and transmit access point information to the AP information collecting server 10. The function of the mobile communication terminal 20 may be implemented in the form of an application.

Hereinafter, the AP information collecting server 10 and the mobile communication terminal 20 in the access point information collecting system are described with reference to FIGS. 6 and 7 in more detail.

Figure 6:
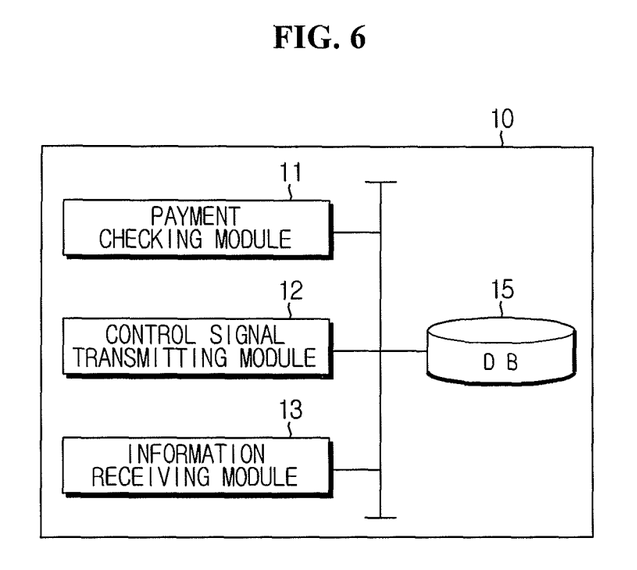
FIG. 6 is a block diagram illustrating a structure of an access point information collecting apparatus according to an exemplary embodiment.

FIG. 6 is a block diagram illustrating a structure of the AP information collecting server 10 according to an exemplary embodiment.

Referring to FIG. 6, the AP information collecting server 10 according to an exemplary embodiment includes a payment checking module 11, a control signal transmitting module 12, an information receiving module 13, and an AP information DB 15.

When the mobile communication terminal 20 executes a mobile card payment, the payment checking module 11 receives payment information from the card company server 30 linked therewith, and checks whether or not the mobile card payment of the mobile communication terminal 20 is approved. The payment checking module 11 receives, from the card company server 30, payment information including identity information relating to the mobile communication terminal and installation location information relating to the POS terminal 31 through which the mobile communication terminal 20 executes a payment.

For this purpose, the payment checking module 11 is connected to the card company server 30 via an exclusive network or a public network. When the mobile communication terminal 20 executes a mobile card payment, the payment checking module 11 receives payment information immediately from the card company server 30. In this instance, the payment information provided to the payment checking module 11 includes an estimated location coordinate of the mobile communication terminal 20 (determined from installation location information of the POS terminal 31) and identity information relating to the mobile communication terminal 20. The payment information is used in identifying the mobile communication terminal 20 for a purpose of transmitting an AP information collecting control signal, or locating an access point based on access point information collected in response to a control signal.

When the payment checking module 11 checks that the mobile card payment of the mobile communication terminal 20 is approved, the control signal transmitting module 12 generates and transmits an AP information collecting control signal to allow the mobile communication terminal 20 to collect access point information. In this instance, the control signal transmitting module 12 extracts identity information relating to the mobile communication terminal 20 from the payment information received from the card company server 30, and generates and transmits an AP information collecting control signal to the mobile communication terminal 20 based on the extracted identity information.

The AP information collecting control signal enables the mobile communication terminal 20 to execute an access point information collecting function to collect access point information. The access point information collecting control signal may take the form of, for example, an SMS triggering message. In particular, the SMS triggering message is a control signal to trigger the execution of a function of the mobile communication terminal 20 to perform an operation corresponding to the function.

The collection information receiving module 13 receives access point information collected by the mobile communication terminal 20 in response to the control signal that was generated and transmitted by the control signal transmitting module 12. The received access point information includes identity information and signal strength information relating to nearby access points detected by the mobile communication terminal 20.

The AP information DB 15 stores or updates the access point information received by the collection information receiving module 13. Also, the AP information DB 15 stores or updates location coordinates where the access point information is collected by the mobile communication terminal 20. Accordingly, installation location information relating to access points may be organized or sorted based on the signal strength values and the location coordinates of the mobile communication terminal 20, which makes it possible to estimate a location of an access point for which information is not collected. The estimated location information is used in measuring a location of a user using an access point, thereby offering a more accurate and precise location measuring service.

Figure 7:
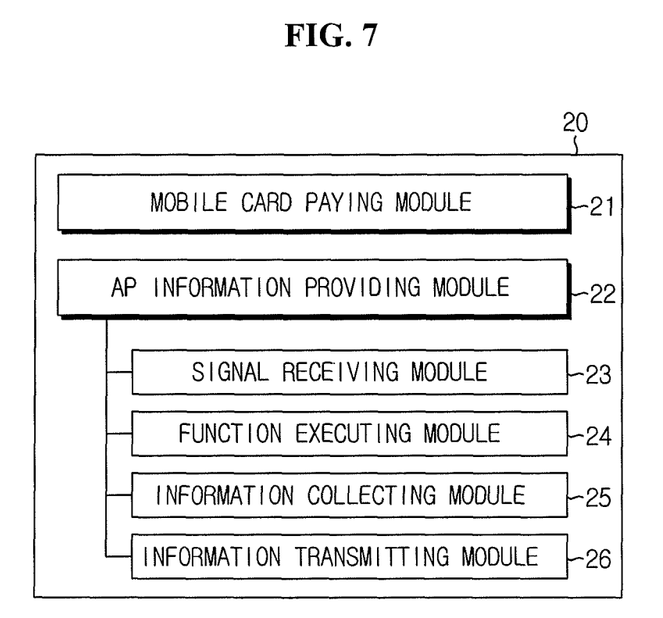
FIG. 7 is a block diagram illustrating a structure of a mobile communication terminal used in an access point information collecting system according to an exemplary embodiment.

FIG. 7 is a block diagram illustrating a structure of the mobile communication terminal 20 used in the access point information collecting system according to an exemplary embodiment.

Referring to FIG. 7, the mobile communication terminal 20 according to an exemplary embodiment includes a mobile card paying module 21 and an AP information providing module 22.

The mobile card paying module 21 has mobile card information, and executes a mobile card payment through the POS terminal 31 using a mobile card paying function. For example, the mobile card paying module 21 may include at least one of a radio-frequency identification (RFID) module, a near field communication (NFC) module, a credit card module, a smart card module, and the like.

The AP information providing module 22 receives an AP information collecting control signal from the AP information collecting server 10, and detects and collects information relating to nearby access points. The AP information providing module 22 may be mounted in the mobile communication terminal 20 in the form of an application. That is, the AP information providing module 22 may operate an application to perform a function of the application in response to the received control signal.

The AP information providing module 22 includes a signal receiving module 23, a function executing module 24, an information collecting module 25, and an information transmitting module 26.

The signal receiving module 23 receives an AP information collecting control signal transmitted from the AP information collecting server 10. The function executing module 24 executes an AP information collecting function when the signal receiving module 23 receives the control signal. The information collecting module 25 detects and collects information relating to nearby access points, including, for example, identity information and signal strength information. The information transmitting module 26 transmits the access point information collected by the information collecting unit 25 to the AP information collecting server 10.

According to this process, when the mobile communication terminal 20 executes a mobile card payment through the mobile card paying module 21, payment information is transmitted to the AP information collecting server 10 through the card company server 30 managing the POS terminal 31. Through the AP information providing module 22, an AP information collecting control signal is received from the AP information collecting server 10, and in response to the control signal, access point information is collected and transmitted.

Accordingly, information relating to access points installed in an area inaccessible by a scanning vehicle, such as, for example, the inside of a building, can be collected through the mobile communication terminal 20.

Hereinafter, an access point information collecting method according to an exemplary embodiment is described with reference to FIG. 8.

Figure 8:
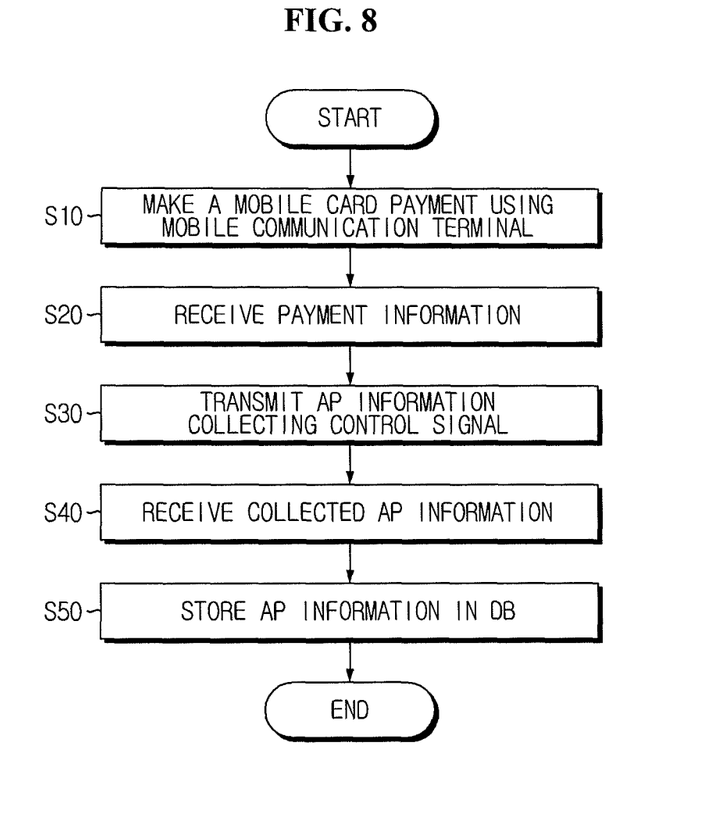
FIG. 8 is a flowchart illustrating an access point information collecting method according to an exemplary embodiment.

FIG. 8 is a flowchart illustrating an access point information collecting method according to an exemplary embodiment.

Referring to FIG. 8, an access point information collecting method according to an exemplary embodiment starts with occurrence of an event that the mobile communication terminal 20 configured for executing a mobile card paying function executes a mobile card payment through the POS terminal 31, in operation S10.

In operation S20, when the mobile card payment is approved, the AP information collecting server receives, from the card company server 30, payment information including location information relating to the POS terminal 31 and identity information relating to the mobile communication terminal 20.

In operation S30, the AP information collecting server 10 generates and transmits an AP information collecting control signal to the mobile communication terminal 20 based on the identity information relating to the mobile communication terminal 20 included in the received payment information.

In operation S40, the AP information collecting server 10 receives access point information collected by the mobile communication terminal information in response to the control signal.

In operation S50, the AP information collecting server 10 stores or updates the received access point information in the AP information DB 15.

According to this method, information relating to access points installed in an area difficult to scan, such as, for example, the inside of a building can be obtained using a mobile communication terminal 20 that collects information relating to nearby access points when a customer executes a mobile card payment through a POS terminal 31. Accordingly, the collected information may be used to populate a more accurate DB for a location-based service.

Figure 9:
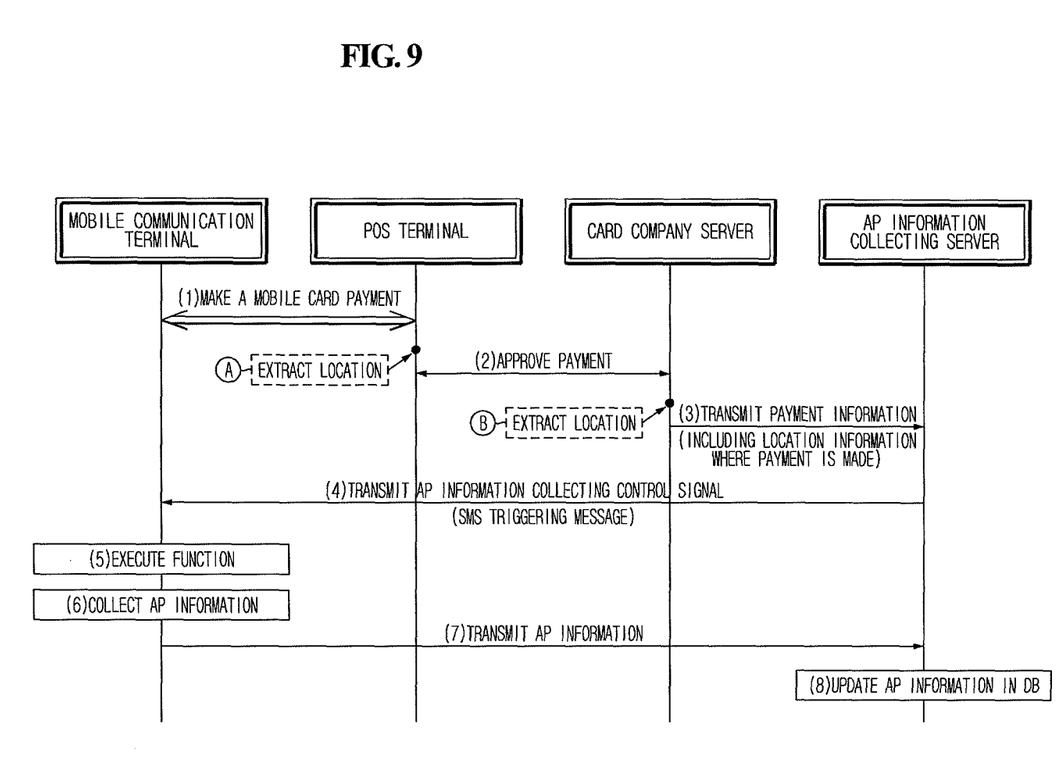
FIG. 9 is a diagram illustrating a signal processing flow between nodes in an access point information collecting system according to an exemplary embodiment.

FIG. 9 is a diagram illustrating a signal processing flow between nodes in the access point information collecting system according to an exemplary embodiment.

Referring to FIG. 9, a signal processing flow between nodes in the access point information collecting system according to an exemplary embodiment is described below.

In operation 1, a customer attempts to execute a mobile card payment with a mobile communication terminal through a POS terminal installed in a particular affiliated shop. In this instance, the customer attempts to pay the charge to the POS terminal through a mobile card paying module mounted in the mobile communication terminal.

In operation 2, when the mobile card payment is executed through the POS terminal, the POS terminal proceeds with payment approval with the card company server.

In operation 3, after the card company server approves the payment of the mobile communication terminal, the card company server transmits, to the linked AP information collecting server, payment information, including identity information relating to the mobile communication terminal and location information relating to where the mobile communication executes a mobile payment.

In this instance, referring to operation A, the location information relating to where the mobile communication executes a mobile payment may be extracted from location information relating to the POS terminal when the POS terminal requests payment approval from the card company server, or, referring to operation B, may be extracted from installation location information relating to the POS terminal stored in a POS location DB managed by the card company server.

In operation 4, the AP information collecting server transmits an AP information collecting control signal to the mobile communication terminal based on the identity information relating to the mobile communication terminal included in the payment information. The purpose of the AP information collecting control signal is to remotely control the mobile communication terminal to execute an access point information collecting function embedded therein.

In operation 5, when the mobile communication terminal receives the AP information collecting control signal from the AP information collecting server, the mobile communication terminal operates an AP information providing module mounted therein to execute a function to collect access point information. This may be implemented through an SMS triggering message.

In operation 6, the mobile communication terminal detects nearby access points and measures the signal strength of respective signals emitted by the access points by the execution of a function of the AP information providing module. In this way, information relating to access points near the mobile communication terminal is collected by the execution of the function.

In operation 7, the mobile communication terminal transmits the collected access point information to the AP information collecting server. This operation may be implemented by the execution of a function of the mobile communication terminal.

In operation 8, the AP information collecting server stores or updates the access point information collected by the mobile communication terminal in a DB. Accordingly, it is possible to organize data of access points of which a location is not identified, and thereby to offer more accurate and precise access point information through the DB constructed based on the organized data.

According to the teachings above, when the mobile communication terminal executes a mobile card payment through the POS terminal in linkage with the mobile card payment system, the mobile communication terminal is induced to collect and provide information relating to nearby access points that is used to construct a DB. Accordingly, information relating to access points installed in an area which is difficult to scan using a vehicle may be obtained, thereby increasing the accuracy in measuring a location of a user using an access point and improving the service quality.

The access point described in one or more of the exemplary embodiments may be called a micro base station, a pico base station, a UbiCell base station, and the like, depending on the policies of manufacturers or communication providers. Accordingly, it should be understood that the access point of one or more of the exemplary embodiments is a gateway point capable of providing an Internet service to a mobile terminal through a common Internet line by directly communicating with the mobile terminal via local area communications.

A method of one or more exemplary embodiments may be recorded in one or more types of non-transitory computer-readable media (such as, for example, a compact disk—read-only memory (CD ROM), random access memory (RAM), read-only memory (ROM), floppy disks, hard disks, magneto-optical disks, and the like) which include program instructions to implement various operations which are executable by a computer.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An access point information collecting method for collecting information relating to at least one access point in linkage with a mobile card payment system, the method comprising:
   (a) receiving, by an access point information collecting server, when a payment has been executed and approved, payment information relating to a mobile communication terminal from a card company server;
   (b) transmitting, by the access point information collecting server, an access point information collecting control signal to the mobile communication terminal based on the received payment information,
   wherein the transmitting the access point information collecting control signal is performed as a result of the payment being executed and approved and the payment information being received, such that if the payment is not executed and approved, the access point information collecting control signal is not transmitted;
   (c) receiving, by the access point information collecting server, access point information collected by the mobile communication terminal and transmitted in response to the control signal; and
   (d) storing, by the access point information collecting server, the received access point information in a storage means.

2. The access point information collecting method according to claim 1,
   wherein the payment information in operation (a) includes identity information relating to the mobile communication terminal and location information relating to where the mobile communication terminal is used for executing the payment.

3. The access point information collecting method according to claim 2,
   wherein the location information relating to where the mobile communication terminal is used for executing the payment is extracted from installation location information relating to a point-of-sale (POS) terminal stored in the card company server.

4. The access point information collecting method according to claim 2,
   wherein the location information relating to where the mobile communication terminal is used for executing the payment is provided from the POS terminal when the mobile communication terminal is used for executing the payment.

5. The access point information collecting method according to claim 2,
   wherein the identity information relating to the mobile communication terminal is provided from the mobile communication terminal through the POS terminal, and is used for transmitting the control signal in operation (b).

6. The access point information collecting method according to claim 5,
   wherein the identity information relating to the mobile communication terminal includes at least one of a telephone number, an international mobile subscriber identity (IMSI), a mobile station international subscriber directory number (MSISDN), a mobile identification number (MIN), and an international mobile equipment identity (IMEI) of the mobile communication terminal.

7. The access point information collecting method according to claim 1, wherein when the mobile communication terminal receives the access point information collecting control signal transmitted in operation (b), the mobile communication terminal is configured to:
   execute an access point information collecting function in response to the control signal, wherein the access point information collection function includes
      detecting the at least one access point and measuring a signal strength of the detected at least one access point; and
      transmitting the measured signal strength of the detected at least one access point.

8. The access point information collecting method according to claim 7,
   wherein the access point information collecting control signal is a short messaging service (SMS) triggering message, and the mobile communication terminal is further configured to execute the access point information collecting function in response to receipt of the SMS triggering message.

9. The access point information collecting method according to claim 1,
   wherein the information stored in the storage means in operation (d) includes at least one of location information relating to where the mobile communication terminal is used to execute the payment, identity information relating to each access point detected by the mobile communication terminal, and signal strength information relating to a respective signal emitted from each access point and measured by the mobile communication terminal.

10. An access point information collecting apparatus for collecting information relating to at least one access point in linkage with a mobile card payment system, the apparatus comprising:
   a payment checking means for receiving, when a payment has been executed and approved, payment information relating to a mobile communication terminal from a card company server;
   a control signal transmitting means for transmitting an access point information collecting control signal to the mobile communication terminal based on the payment information received by the payment checking means, wherein the transmitting the access point information collecting control signal is performed as a result of the payment being executed and approved and the payment information being received, such that if the payment is not executed and approved, the access point information collecting control signal is not transmitted;

an information receiving means for receiving access point information collected by the mobile communication terminal and transmitted in response to the control signal; and a storage means for storing the access point information received by the information receiving means.

11. The access point information collecting apparatus according to claim 10, wherein the payment information received by the payment checking means includes identity information relating to the mobile communication terminal and location information relating to where the mobile communication terminal is used to execute the payment.

12. The access point information collecting apparatus according to claim 11, wherein the location information relating to where the mobile communication terminal is used to execute the payment is extracted from installation location information relating to a point-of-sale (POS) terminal stored in the card company server.

13. The access point information collecting apparatus according to claim 11, wherein the location information relating to where the mobile communication terminal is used to execute the payment is provided from the POS terminal when the mobile communication terminal is used to execute the payment.

14. The access point information collecting apparatus according to claim 10, wherein the access point information collecting control signal transmitted by the control signal transmitting means is a short messaging service (SMS) triggering message, and an access point information collecting function of the mobile communication terminal is executed in response to receipt of the SMS triggering message.

15. The access point information collecting apparatus according to claim 10, wherein the information stored in the storage means includes at least one of location information relating to where the mobile communication terminal is used to execute the payment, identity information relating to each access point detected by the mobile communication terminal, and signal strength information relating to a respective signal emitted by each access point and measured by the mobile communication terminal.

16. A mobile communication terminal for collecting information relating to at least one access point in linkage with a mobile card payment system, the mobile communication terminal comprising a smart phone device, wherein the smart phone device includes:

a mobile card paying module having a mobile card paying function which is used to execute a payment through a point-of-sale (POS) terminal; and an access point information providing module which receives, when the payment has been executed and approved, an access point information collecting control signal from an access point information collecting system when the mobile card paying module is used to execute the mobile card payment, wherein the receiving the access point information collecting control signal is a result of the payment being executed and approved, such that if the payment is not executed and approved, the access point information collecting control signal is not transmitted to the mobile communication terminal, and which collects information relating to the at least one access point in response to the control signal, and which transmits the collected access point information to the access point information collecting system.

17. The mobile communication terminal according to claim 16, wherein the access point information providing module includes:

a signal receiving module which receives the access point information collecting control signal;

a function executing module which executes an access point information collecting function in response to receipt of the control signal;

an information collecting module which detects the at least one access point and measures a signal strength of a respective signal emitted by each of the detected at least one access point by the execution of the function; and an information transmitting module which transmits the measured signal strength information collected by the information collecting module.

18. The mobile communication terminal according to claim 16, wherein the access point information collecting control signal received from the access point information collecting system is a short messaging service (SMS) triggering message, and wherein the access point information providing module is configured to execute the access point information collecting function in response to receipt of the SMS triggering message.

19. The mobile communication terminal according to claim 16, wherein the access point information providing module is installed in the mobile communication terminal in a form of an application.

* * * * *